(12) United States Patent
Sato et al.

(10) Patent No.: US 9,975,643 B2
(45) Date of Patent: May 22, 2018

(54) INTAKE STRUCTURE OF AIRCRAFT

(71) Applicant: SUBARU CORPORATION, Tokyo (JP)

(72) Inventors: Kazushige Sato, Tokyo (JP); Hideo Iso, Tokyo (JP); Takeshi Osuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 80 days.

(21) Appl. No.: 15/065,580

(22) Filed: Mar. 9, 2016

(65) Prior Publication Data

US 2016/0280388 A1 Sep. 29, 2016

(30) Foreign Application Priority Data

Mar. 26, 2015 (JP) .................................. 2015-064210

(51) Int. Cl.
*B64D 33/02* (2006.01)
*B64C 21/10* (2006.01)

(52) U.S. Cl.
CPC .............. *B64D 33/02* (2013.01); *B64C 21/10* (2013.01); *B64D 2033/0226* (2013.01); *Y02T 50/166* (2013.01)

(58) Field of Classification Search
CPC B64D 33/02; B64D 2033/0226; B64C 21/10; Y02T 50/166
See application file for complete search history.

(56) References Cited

U.S. PATENT DOCUMENTS

| | | | | |
|---|---|---|---|---|
| 2,990,142 A | | 6/1961 | Ferri | |
| 4,174,083 A | * | 11/1979 | Mohn | B64D 33/02 137/15.1 |
| 5,730,393 A | * | 3/1998 | Hatrick | B64C 21/00 244/110 B |
| 5,779,189 A | * | 7/1998 | Hamstra | B64C 7/00 137/15.1 |
| 5,957,413 A | * | 9/1999 | Glezer | B64C 21/08 244/208 |
| 6,267,331 B1 | * | 7/2001 | Wygnanski | B64C 21/04 244/204 |
| 8,297,058 B2 | | 10/2012 | Leland et al. | |
| 2010/0051756 A1 | * | 3/2010 | Leland | B64D 33/02 244/53 B |
| 2011/0136425 A1 | * | 6/2011 | Eichholz | B64C 7/00 454/76 |
| 2016/0376018 A1 | * | 12/2016 | Troia | B64C 23/04 244/53 B |

FOREIGN PATENT DOCUMENTS

JP S56-17799 A 2/1981

OTHER PUBLICATIONS

J. Seddon et al., "Intake Aerodynamics, Second Edition", 1999, American Institute of Aeronautics and Astronauts, Inc.
Notice of Reasons for Refusal issued in corresponding Japanese Application No. 2015-064210, dated Sep. 20, 2016.

* cited by examiner

*Primary Examiner* — Valentina Xavier
(74) *Attorney, Agent, or Firm* — McDermott Will & Emery LLP

(57) ABSTRACT

In an intake structure of an aircraft that takes in air from a front side of an airframe, a bump is provided on a surface of the airframe of the aircraft at a portion immediately before an intake. The bump is formed so as to smoothly protrude from the front side of the airframe while having a width that is wider than a width of the intake.

8 Claims, 2 Drawing Sheets

INTAKE STRUCTURE OF AIRCRAFT

CROSS-REFERENCE TO RELATED APPLICATIONS

The present application claims priority from Japanese Patent Application No. 2015-064210 filed on Mar. 26, 2015, the entire contents of which are hereby incorporated by reference.

BACKGROUND

1. Technical Field

The present invention relates to an intake structure of an aircraft and, particularly, relates to a technique that is useful in suppressing a boundary layer from flowing into an intake.

2. Related Art

In designing a structure of an intake (an air intake) of an aircraft, the manner in which a boundary layer, which develops in front of the intake and on a surface of an airframe, is dealt with is important. Since the boundary layer is an airflow that has lost its energy due to friction with the surface of the airframe, when the boundary layer flows into the intake and is supplied to the engine, problems such as a decrease in engine performance occur.

Regarding the technique of preventing the boundary layer from flowing into the intake, a technique has been known for a long time in which a diverter (a wall screening the boundary layer) is provided between a gap, which is about the thickness of the boundary layer, provided between the intake and the surface of the airframe. While the technique employing the diverter is capable of allowing only the airflow outside the boundary layer to flow into the intake, problems such as decrease in airframe performance due to the weight and air resistance of the diverter itself occur.

Accordingly, in recent years, as a technique for removing the inflow of the boundary layer without resorting to a diverter, a diverterless intake in which a bump is provided on a surface of the airframe in front of the intake has been proposed and is in practical use (see U.S. Pat. No. 5,779,189, for example). In the above diverterless intake, the boundary layer is removed to the side of the intake with a pressure gradient created on the bump such that the boundary layer is suppressed from flowing into the intake.

SUMMARY OF THE INVENTION

However, in the diverterless intake that is in practical use at present, the width of the bump is smaller than the width of the intake. Accordingly, a concentration of airflow may disadvantageously occur in the vicinity of the lateral portion of the intake and, consequently, degradation in aerodynamic characteristics such as increase in air resistance may be disadvantageously caused.

It is desirable to suppress the boundary layer from flowing into the intake while suppressing concentration of airflow in the vicinity of the lateral portion of the intake.

An aspect of the invention provides an intake structure of an aircraft that takes in air from the front side of the airframe. The intake structure of the aircraft includes a bump that is provided on a surface of the airframe of the aircraft at a portion immediately before an intake, the bump formed so as to smoothly protrude from the front side of the airframe while having a width that is wider than a width of the intake.

The bump may be formed from the front side of the airframe towards the intake while the width of the bump increases in a smooth manner.

DETAILED DESCRIPTION

Hereinafter, an example of the present invention will be described with reference to the drawings.

Figure 1:
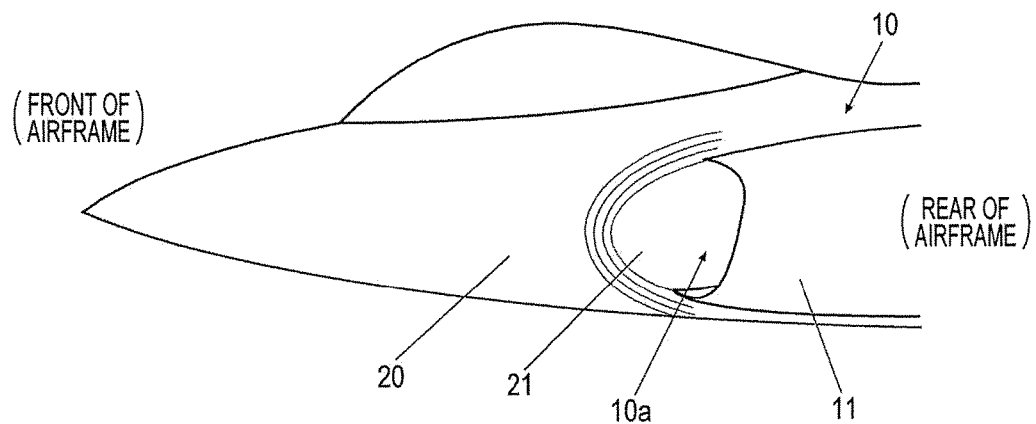
FIG. 1 is a perspective view of a portion of an aircraft around an intake duct.
Figure 2:
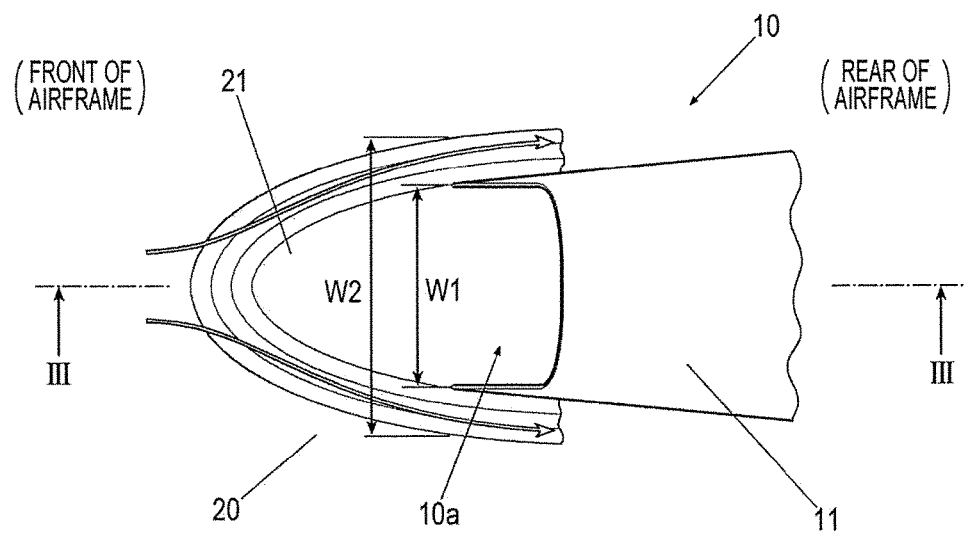
FIG. 2 is a plan view of the portion around an intake.
Figure 3:
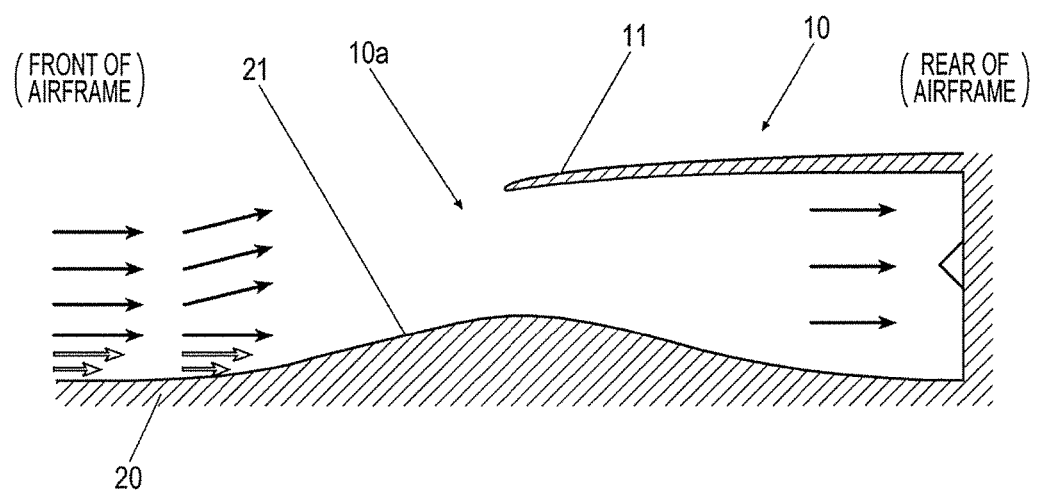
FIG. 3 is a cross-sectional view taken along line III-III of FIG. 2.

FIG. 1 is a perspective view of a portion of an aircraft around an intake duct 10 including an intake 10a according to the present example. FIG. 2 is a plan view of the portion around the intake 10a. FIG. 3 is a cross-sectional view taken long line III-III of FIG. 2.

As illustrated in FIG. 1, the intake duct 10 is provided on a fuselage 20 of the aircraft and guides air taken in from the intake (the air intake) 10a, which open towards a front of an airframe, to an engine (not illustrated) disposed behind the intake duct 10.

More specifically, the intake duct 10 protrudes in the lateral direction of the airframe so as to cover a surface of the fuselage 20 with a substantially U-shaped duct wall 11 extending substantially along the airframe in the front-rear direction. The above surface of the fuselage 20 and the duct wall 11 constitute a duct pipe.

A bump 21 that protrudes in a smooth manner is provided in a portion around the intake 10a on the surface of the fuselage 20 constituting the duct pipe.

As illustrated in FIGS. 2 and 3, the bump 21 is formed so as to smoothly protrude from a portion immediately before the intake 10a while increasing its width, and to smoothly descend after passing the intake 10a.

A width (the maximum width) W2 of the substantially front-half portion of the bump 21 located immediately before the intake 10a is formed so as to be wider than a width (the maximum width) W1 of the intake 10a. Accordingly, among the airflow flowing from the front side towards the intake 10a while the aircraft is flying, as illustrated by the arrows in FIGS. 2 and 3, the boundary layer on the surface of the fuselage 20 is reliably removed to both sides of the intake 10a with the pressure gradient created on the bump 21.

As described above, according to the intake structure of the present example, the bump 21 that is formed so as to smoothly protrude from the front side of the airframe at a portion on the surface of the airframe (the fuselage 20) of the aircraft immediately before the intake 10a while being formed so as to have the width W2 that is wider than the width W1 of the intake 10a is provided.

With the above, the boundary layer that flows from the front side of the airframe towards the intake 10a is, with the pressure gradient created on the bump 21, reliably removed sideways that are farther away from the lateral portion of the intake 10a.

Accordingly, the boundary layer can be suppressed from flowing into the intake 10a while concentration of the airflow in the vicinity of the lateral portion of the intake 10a is suppressed. Consequently, degradation of the aerodynamic characteristics such as increase in the air resistance, and decrease in engine performance can be suppressed.

Note that the example to which the present invention can be applied is not limited to the example described above, and modifications can be appropriately made without departing from the scope of the present invention.

The invention claimed is:

1. An intake structure of an aircraft that takes in air from a front side of an airframe, the intake structure comprising:
   a bump that is provided on a surface of the airframe of the aircraft at a portion immediately before an intake, the bump formed so as to smoothly protrude from the front side of the airframe, wherein:
   surfaces in a vicinity of a circumferential edge of the bump, at which the bump begins to protrude, are substantially flat, and
   in a plan view of a portion around the intake, a maximum width of the bump is wider than a maximum width of the intake.

2. The intake structure of an aircraft according to claim 1, wherein
   the bump is formed from the front side of the airframe towards the intake while a width of the bump increases in a smooth manner.

3. The intake structure of an aircraft according to claim 2, wherein
   in a width direction of the bump, the bump comprises a portion residing at a side of a lateral portion of the intake.

4. The intake structure of an aircraft according to claim 1, wherein
   the bump is configured to create a pressure gradient to a width direction of the bump and remove a boundary layer that flows from the front side of the airframe sideways that are farther away from a lateral portion of the intake.

5. The intake structure of an aircraft according to claim 2, wherein
   the bump is configured to create a pressure gradient to a width direction of the bump and remove a boundary layer that flows from the front side of the airframe sideways that are farther away from a lateral portion of the intake.

6. The intake structure of an aircraft according to claim 3, wherein
   the bump is configured to create a pressure gradient to the width direction of the bump and remove a boundary layer that flows from the front side of the airframe sideways that are farther away from the lateral portion of the intake.

7. The intake structure of an aircraft according to claim 1, wherein
   the bump includes surfaces that slope upwards toward the portion immediately before the intake and smoothly descend downwards after passing the intake.

8. An intake structure of an aircraft that takes in air from a front side of an airframe, the intake structure comprising:
   a first surface of the airframe of the aircraft; and
   a bump that is provided on the first surface of the airframe of the aircraft at a portion immediately before an intake of the aircraft, the bump formed so as to smoothly protrude from the front side of the airframe,
   wherein the bump includes a second surface that defines an upward slope, the upward slope smoothly continuing and gradually sloping upwardly from the first surface toward the intake, and
   wherein, in a plan view of a portion around the intake, a maximum width of the bump is wider than a maximum width of the intake.

* * * * *